INVENTORS.
DONALD T. BRAY
ROSS M. BROWN

INVENTORS.
DONALD T. BRAY
ROSS M. BROWN
BY
Agent

United States Patent Office 3,493,496
Patented Feb. 3, 1970

3,493,496
PURIFIED WATER SUPPLY APPARATUS AND METHOD
Donald T. Bray, Escondido, and Ross M. Brown, Palos Verdes Estates, Calif., assignors to Desalination Systems, Inc., San Diego, Calif., a corporation of California
Filed May 13, 1968, Ser. No. 728,410
Int. Cl. B01d 29/00, 13/00
U.S. Cl. 210—23
10 Claims

ABSTRACT OF THE DISCLOSURE

Apparatus for supplying water under pressure from a water purification system which operates by introduction of impure water under pressure. A pressure-resistant closed tank is arranged to contain a driving fluid under pressure and into which purified water from the purification unit is introduced. The driving fluid, which may be a compressed gas, for example air, or a liquid under pressure, for example water, drives stored water in the pressure-resistant tank under pressure to point of use. The driving fluid and temporarily stored water in the pressure-resistant tank are separated by separation means, for example a diaphragm.

---

This invention relates to a water supply device and one that will supply water from a water purification unit to point of use under pressure. The invention is particularly adapted for use in temporarily storing, under pressure, water which has been purified by a purifying system operating under above atmospheric pressure, such as reverse osmosis.

Systems for purifying water by reverse osmosis have now become practical. The process consists essentially of forcing impure water under pressure through a semi-permeable membrane which separates salts and contaminant solids. The product water is of much improved purity; treatment of brackish water, for example, can produce a potable product containing less than 500 p.p.m. of total dissolved solids.

Requirements for better and purer water for household use can readily be met by small compact reverse osmosis units which can produce pure and palatable water at a relatively low rate but in quite sufficient total quantity. Since the reverse osmosis unit operates continuously, or continuously for intervals, the product water must be temporarily stored to provide sufficient water to meet an occasional relatively high demand rate. This has heretofore been accomplished by storing the water in a catch tank and providing this with a product water pump which must be arranged to automatically start and stop to supply water under pressure at required time periods. Alternatively the product water may be pumped to an elevated storage tank and its pressure head used for supply pressure, but this may often be more expensive, inconvenient and difficult to install for a small household supply.

Summarized briefly, this invention contemplates a closed pressure-resistant tank containing a driving fluid under pressure and into which product water from a purification unit is transferred and stored temporarily. The purification unit is specifically one that operates by introduction thereinto of impure water at above atmospheric pressure, as in reverse osmosis. The pressure of the product water output from the purification unit is controlled to overcome the driving pressure of the fluid in the pressure-resistant tank so that during periods of non-use the slow output of product water gradually builds up a supply under pressure in the pressure tank ready for use when required. The driving fluid in the pressure tank may be a volume of gas such as air which is compressed as purified water is introduced in the tank. Expansion of the compressed air will provide driving force to distribute product water from the tank to point of use as required. Since air or other gas may be absorbed in the water, or released therefrom, and its volume and amount may thereby not remain constant, separation means are employed, such as a diaphragm sealed at its edges to the tank's inner wall. This can transmit pressure from expanding gas or liquid without permitting contact therewith.

An important alternative embodiment employs water under pressure as the driving fluid and separated by a diaphragm as described above to prevent contamination of the purified product water in the pressure tank. Since the water purification unit must employ water under pressure as a feed, it is convenient and efficient to connect the impure water supply line after suitable pressure reduction to the driving fluid side of the diaphragm. Thus the high pressure water being fed to the purification unit is also used as the source of driving fluid in the pressure storage tank. Arrangements of check valves and pressure regulating valves are employed in these embodiments to effect the desired pressure control and output of purified water as described in more detail hereinafter.

The features of this invention and further uses and advantages will become more readily apparent by reference to the following drawings in which.

Figure 1:
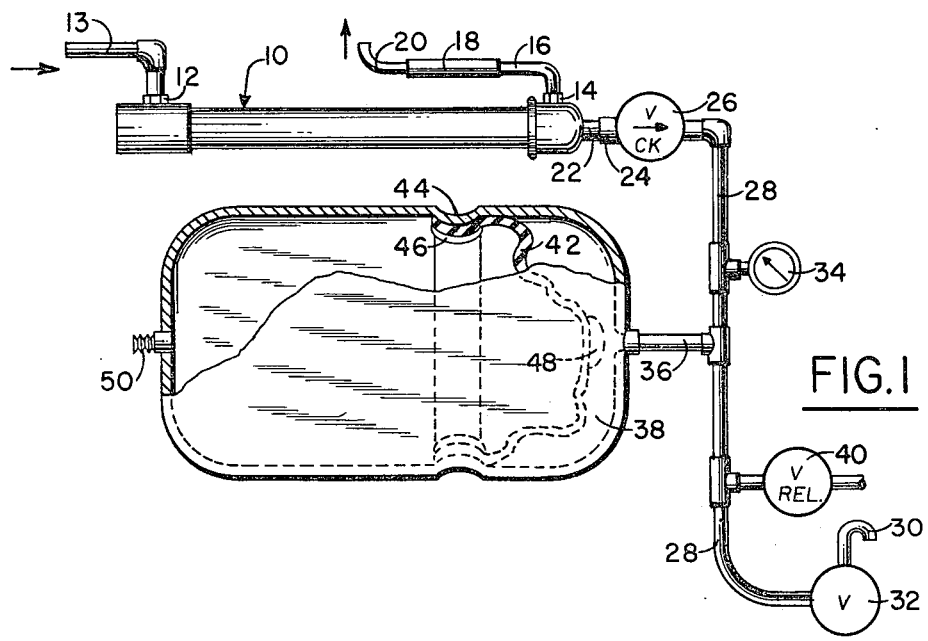
FIG. 1 illustrates apparatus embodying features of this invention, particularly when a gas under pressure is used in a pressure tank having a flexible diaphragm.

Referring now to FIG. 1, a reverse osmosis unit 10 is employed as a water purification unit, and which will be described in more detail hereinafter. Unit 10 is fitted with an impure water connection at 12 connecting to a pipe 13 for supply of impure water under pressure, and a brine outlet at 14 which is connected by piping 16 to flow regulator valve 18 and this in turn is fitted with the brine disposal connection 20.

Regulator valve 18 may be of any suitable type to control brine discharge from the unit and to maintain the water therein at pressure required for effective reverse osmosis. Conveniently, valve 18 is constructed using coil of fine tubing through which the brine passes, the resistance of the coil providing desired flow regulation.

The purified product water outlet 22 of unit 10 is connected by pipe 24 to the inlet of check valve 26, the outlet of check valve 26 is connected by pipe 28 to distribution or a point of use illustrated, for example, as fount 30 controlled by valve 32. Pipe 28 also connects as shown to pressure gauge 34; and through pipe 36 to the interior of pressure tank 38; and also to pressure relief valve 40. Inside pressure tank 38 is a diaphragm 42 of rubber or other flexible material impervious to both the driving fluid and water, and which is attached at its outer edge to the inner wall of pressure tank 38. This is accomplished by provision of annular internal projection 44 formed in the wall of pressure tank 38 over which the edge of diaphragm 42 is lapped and maintained firmly in position and in sealing engagement by snap ring 46. Diaphragm 42 is preferably fitted with heavy rubber plug 48 which will abut the wall area at the entry of pipe 36 to protect the diaphragm from rupture when pressed against this opening.

The other end of pressure tank 38, that is the end on the other side of diaphragm 42, is provided with a valved connector 50 for introduction of air when required, and which may advantageously be constructed in the same manner as a bicycle valve and of which no further description or detail should be needed.

Figure 2:
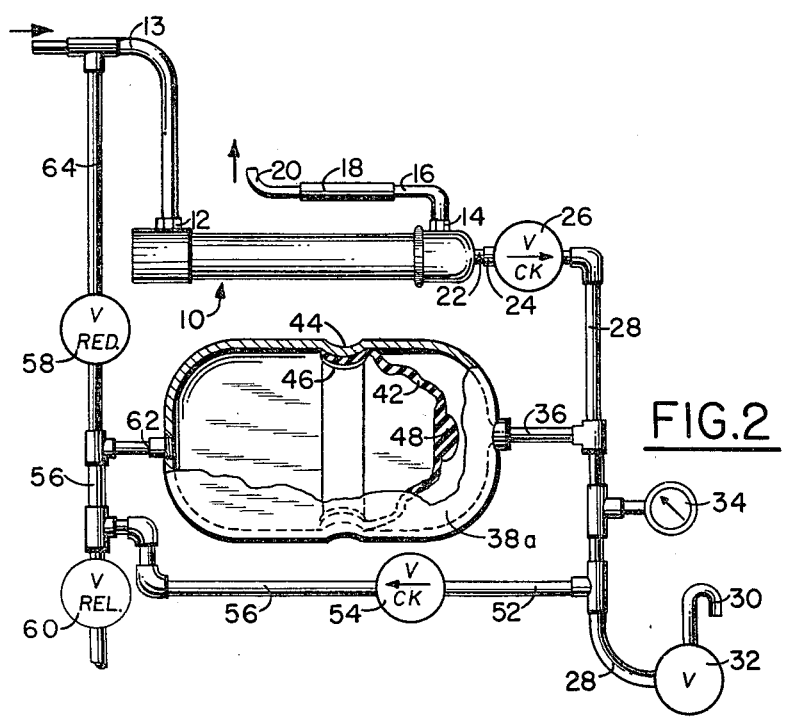
FIG. 2 illustrates apparatus embodying an alternative design in which water under pressure is employed as driving fluid in a diaphragm type pressure tank.

In FIG. 2 an embodiment is illustrated in which a diaphragm type pressure tank is employed and the driving fluid is water under pressure. In this case the module 10 is fitted with water inlet 12, brine outlet at 14 leading to regulator valve 18 and brine disposal connection 20. As in FIG. 1, purified water outlet 22 is connected by pipe 24 to check valve 26 which in turn is conected to fount 30 controlled by valve 32, to pressure gauge 34, and also by pipe 36 to the interior of pressure tank 38a. This pressure tank 38a differs from pressure tank 38 in FIG. 1 in that the edge of flexible diaphragm 42 is sealed around the inner wall in a position somewhat more centrally located, and the volume of tank 38a is slightly larger in capacity than the volume of purified water to be stored therein. This is so arranged because the gaseous driving fluid used in the embodiment of FIG. 1 needs more room for expansion at is drives than does the liquid driving fluid employed in the embodiment of FIG. 2, and therefore, the capacity of tank 38 will be larger, for example, from 20% to 300% larger than the volume of the water to be stored therein. As shown, diaphragm 42 is provided with plug 48 and is sealed to internally projecting ring 44 by snap ring 46.

In addition to the connections already described for pipe 28 this is also connected by pipe 52 to the inlet of a second check valve 54, the outlet of check valve 54 being connected by pipe 56 to the outlet of pressure reducing valve 58. Pipe 56 also connects with pressure relief valve 60, and through pipe 62 to the other end of pressure tank 38a. The inlet of pressure reducing valve 58 is connected by pipe 64 to the inlet supply line 13 feeding water to be purified under pressure to inlet 12 of unit 10.

Figure 3:
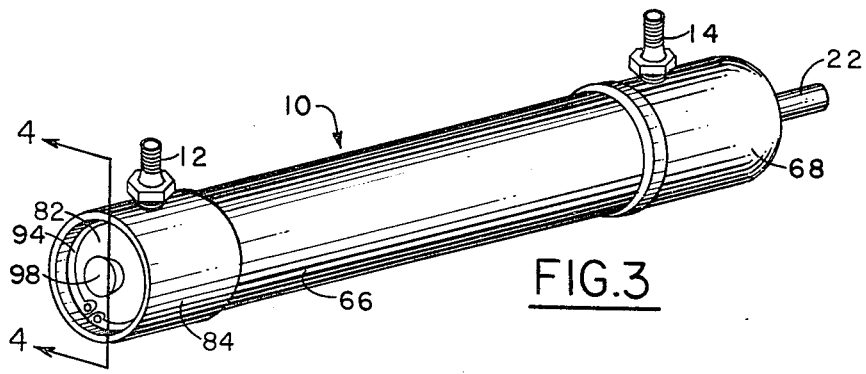
FIG. 3 shows a general perspective view of a reverse osmosis unit suitable for use as a water purification unit according to this invention.
Figure 4:
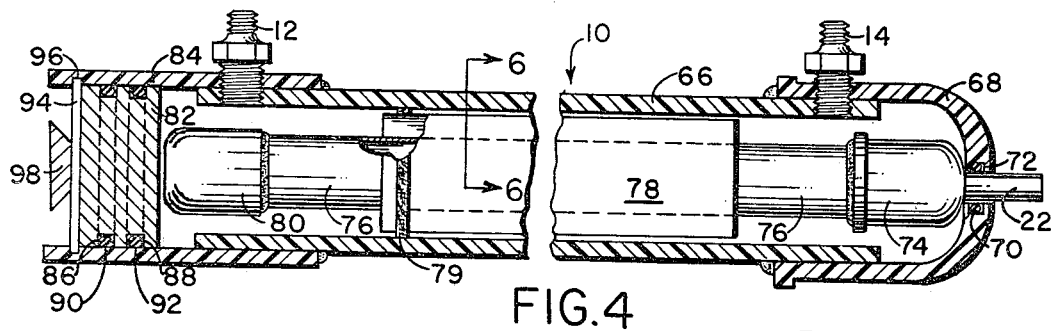
FIG. 4 shows a vertical central section of the unit of FIG. 4 taken along the line 4—4.

The reverse osmosis unit, designated as 10 on the drawings previously described, is shown in FIGS. 3 to 6. It is of a type with features described and claimed in application Ser. No. 663,998 filed Aug. 29, 1967, Robert D. Hancock inventor and assigned to the assignee of the present invention. In FIG. 3 the unit 10 is shown in perspective and comprises a tubular body shell 66 which conveniently can be constructed of high strength plastic. On one end of body shell 66, considered the outlet end, end cap 68 is fastened by firmly gluing to shell 66. As will be seen more clearly in FIG. 4, end cap 68 is pierced by product tube 22 which is maintained in sealing engagement with cap 68 by O ring 70, arranged as shown in groove 72. Product tube 22 is attached in communication with cap 74 which is in turn attached to membrane pack tube 76, so that product water flowing through tube 76 will be led out of the module through tube 22 for connection to other units in the system. Pack tube 76 is surrounded by a semipermeable membrane pack 78 which will be described hereinafter in more detail and which is sealed against the inner wall of body shell 66 by sealing ring 79. At its outer end tube 76 is tightly sealed by cap 80 which may also be of plastic firmly glued on to the end of tube 76. End closure plug 82 is designed to fit the inside diameter of end piece 84 which is glued tightly as shown on the inlet end of shell 66. Plug 82 is provided with circumferential grooves as at 86 and 88 into which are compressed O ring seals 90 and 92 to tightly seal plug 82 against the inner wall of end piece 84. Plug 82 is maintained snugly in position against the end of cap 80 by snap ring 94 which fits into groove 96 arranged at the desired position in the inner surface of end piece 84. Handle 98 may be attached to the outer surface of plug 82.

End piece 84 is provided with a suitable pipe fitting 12 which communicates with the module interior as shown for introduction of the water to be purified. End cap 68 is also provided with pipe fitting 14 communicating with the interior of the unit at the outlet end and serves as drain for brine. It will be connected to a flow regulator valve as at 18 in FIG. 1.

Figure 5:
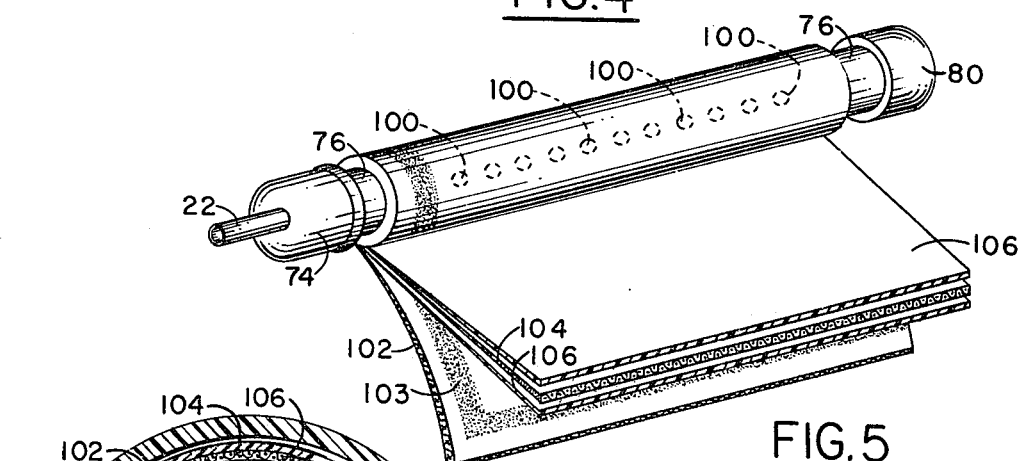
FIG. 5 shows in some detail the membrane pack of the unit of FIGS. 3 and 4, partially unwound.
Figure 6:
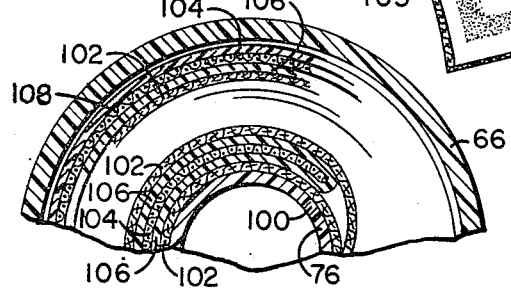
FIG. 6 is a fragmentary enlarged vertical cross sectional view taken along the line 6—6 of FIG. 4.

Construction of the membrane pack 78 may be best understood by reference to FIGS. 5 and 6. As will be seen in FIG. 5, pack tube 76 extends the length of the pack and is perforated at intervals as at 100. Around tube 76 is first wound the end of a length of porous fabric 102, at least one full turn being placed around the tube. Fabric 102 is advantageously formed of a base of sheet material with fine glass beads attached to its surface. The extending length of fabric 102 has a band of suitable adhesive laid around or near its edges as at 103 this band also running adjacent the turn of fabric 102 around tube 76. The adhesive in band 103 soaks through porous fabric 102 to provide gluing surfaces on both sides. Then a sheet of plastic screen 104 is placed between the inner surfaces of a length of doubled over membrane 106, the inner surfaces, that is those next to screen 104, being the active surfaces. Then the crease of the folded membrane 106 with interleaved plastic screen 104 is inserted between porous fabric 102 and the nip of covered tube 76 and the assembly wound up to form a spiral pack. As the pack is wound and formed, the porous fabric 102 becomes glued on each side to faces of membrane 106. As the final turn is taken the end of the outer layer of membrane 106 is overlaid on the end of the porous fabric 102 and the plastic screen 104 is wound over to form the outer layer of the pack. The purified water passes through membrane 106 then through porous fabric 102, through perforations 100 and into tube 76. The inlet water to be purified passes into the membrane pack 78 at one end through the plastic screen 104, and out of the pack through this same screen at the other end as brine.

In FIG. 6 is shown an enlarged fragmentary view of the membrane pack as it appears edgewise. Tube 76 is shown with one of its perforations 100 and around this is a layer of porous fabric 102, then a membrane layer 106, then a layer of plastic screen 104 and then the other membrane layer 106 followed by another porous fabric layer 102, with the sequence repeated to produce the spiral wound pack of desired membrane area. As previously described the rolled pack is arranged with screen 104 as its outer layer, the pack being maintained intact by outer tape winding 108.

The semipermeable membrane 106 is fabricated of material possessing the requisite properties, principally adequate flux, or flow through of purified solution and selectivity, or rejection of salts. Materials which have been found advantageous are cellulose acetate films such as disclosed in Loeb et al. U.S. Patents 3,133,132 and 3,133,-137 and Manjikian U.S. Patent 3,344,214. Other materials may however be employed to obtain required semipermeable properties.

Operation of the apparatus of this invention will be first described for the embodiment illustrated in FIG. 1. Impure feed water is introduced from a source not shown, through pipe 13 and connection 12 into purification unit 10. The feed water may be filtered if desired to remove an undesirable amount of suspended solids such as clay or other particulate impurities. The feed water is introduced at a pressure above atmospheric suited for operation of the reverse osmosis unit; this may, for example when used with a small unit of the type described, be of the order of household line pressure that is 50 to 100 pounds per square inch gauge (p.s.i.g.).

Water to be purified passes through the membrane pack 78 and a purified portion thereof flows out of water outlet 22 while the brine, which is more concentrated in salts contained in the impure feed, is passed out through connection 14 through regulator 18 and to drain through pipe 20.

Meanwhile valve 50 is kept closed to seal a volume of air in pressure tank 38 on the side of the diaphragm removed from water inlet 36. The air in the pressure tank may initially be at atmospheric pressure or may be at slightly more than atmospheric as desired.

Pressure relief valve 40 is set to blow off or relieve pressure at a pressure sufficiently above atmospheric to provide sufficient pressure to transfer purified water through pipe 28 to point of use, shown in this embodiment as fount 30. The pressure at which valve 40 is set is also sufficiently below the feed water pressure to provide an appropriate pressure differential across the semipermeable membrane 106. Advantageously, the valve 40 may be set at 10 to 15 p.s.i.g., which will be adequate for delivery to close use points and yet provide a 40 p.s.i.g. or more for membrane operation (if feed water pressure is 50 p.s.i.g. or more).

As water is produced by the purification unit 10 it is transferred automatically into pressure tank 38 thus forcing diaphragm 42 to the left (in FIG. 1) and compressing the air in the left hand pressure tank compartment. The right hand compartment of the tank continues to fill until the pressure against the diaphragm 42 reaches the relief pressure set by valve 40. Water may be withdrawn from tank 38, via fount 30 by activation of valve 32 when desired, and the output of unit 10 will continue to refill the pressure tank at its normal output rate. As the purified water fills the right hand compartment of pressure tank 38 and compresses the air in the left hand compartment, the air so compressed acts as a driving fluid to maintain the water in the right hand pressure tank compartment at a pressure sufficiently above atmospheric for delivery to point of use, relief valve 40 maintaining the proper pressure relationships as described.

In operation of the embodiment illustrated in FIG. 2, pressure reducing valve 58 is set to reduce the impure water feed line pressure of, for example, 50 to 100 p.s.i.g. to, for example, about 10 p.s.i.g.; and relief valve 60 is set to blow off at, for example, about 15 p.s.i.g. As in the embodiment of FIG. 1, purified water enters pressure tank 38a and forces diaphragm 42 to the left and fills the right hand tank compartment. Pressure in the left hand tank compartment will be maintained above 10 p.s.i.g. due to the setting of regulator valve 58 and will be maintained below about 15 p.s.i.g. since this is the maximum pressure in the system controlled by relief valve 60. Pressure in the pressure tank 38a is always maintained at above 10 p.s.i.g. (less friction loss during periods of water flow) since if withdrawal of water from fount 30 reduces the pressure in the right hand side of tank 38a to below 10 p.s.i.g. then the pressure in line 56 is raised to 10 p.s.i.g. by the 10 p.s.i.g. output from regulator valve 58, check valve 54 automatically closing to prevent entry of impure feed water through pipe 52 into the purified water delivery pipe 28. If tank 38a fills up and pressure rises above 15 p.s.i.g., or the setting of pressure relief valve 60, then excess water will flow through pipe 52, check valve 54, pipe 56 and bleed out relief valve 60. Thus a driving fluid pressure of from 10 to 15 p.s.i.g. is always maintained in pressure tank 38a. Water may be withdrawn as required, within the pressure tank storage capacity, the purification unit output being continually stored or used, or discharged if an oversupply is produced.

In the embodiments illustrated, check valve 26 prevents any return of purified water from storage into the module, and should the impure feed water be shut off the check valve will close to maintain the supply in tank 38 or 38a still under pressure for use. Additional check valve 54 in the embodiment of FIG. 2 prevents impure water from the supply line side of the system from possibly intermixing with purified water in pipe 28. At the same time this check valve allows excess water pressure building up in line 28 and the right hand side of pressure tank 38a to be relieved through pressure relief valve 60.

In the alternative operations described it will be apparent that the pressure of the driving fluid is maintained at a pressure below that at which the water to be purified is introduced into the water purification unit, yet the pressure in the purified water piping is sufficient to provide delivery to point of use. By this method the output of the purification unit is transferred and stored temporarily available for use while at the same time sufficient pressure drop is maintained across the reverse osmosis unit to result in efficient purification of the impure feed water. Normally a few pounds per square inch for example 10–15, will satisfactorily operate the purified water delivery system while a higher pressure for example 40 pounds per square inch or more may be required as pressure drop across the purification unit. Operation in which the driving fluid and the purified water are maintained separate by interposition of a diaphram is advantageous in that no intermixing of driving fluid and purified water can occur.

The apparatus of this invention is well adapted for installation in homes for purification of city water for drinking and cooking purposes. A small reverse osmosis module operating under city water pressure can produce a gallon or several gallons a day of purified water of quality comparable or better than that of "bottled" water delivered regularly in 5 gallon bottles at considerable expense. Operation as described will provide a stored suppy of purified water, which may convenienty be of the order of a gallon or several gallons, under pressure available for use on demand. The cost of such water over a period of time may be substantially less than that of purchased and deivered "bottled" water.

The pressure resistant tank will maintain a useful supply inside a closed container, maintaining purity and taste.

We claim:

1. Apparatus for storing and delivering water produced by a membrane type water purification unit into which water to be purified is introduced at above atmospheric pressure, and from which unit purified water is temporarily stored in a container from which it is delivered under pressure to point of use, in which the improvements comprise:

(a) a closed, pressure-resistant tank into which said purified water is transfered and temporarily stored;
    (b) a driving fluid in said pressure-resistant tank adapted to maintain purified water under pressure therein;
    (c) means in said pressure-resistant tank separating said driving fluid and said purified water; and
    (d) means for maintaining said driving fluid in said pressure-resistant tank at a pressure below that at which water to be purified is introduced into said water purification unit, and sufficiently above atmospheric pressure to maintain said purified water in said pressure-resistant tank under sufficient pressure for delivery to point of use.

2. Apparatus according to claim 1 in which said means separating said driving fluid and said purified water comprises a flexible diaphragm impervious to water and said driving fluid.

3. Apparatus according to claim 2 in which said diaphragm is attached at its outside edges to the inner wall of said pressure resistant tank in sealing engagement therewith.

4. Apparatus according to claim 1 in which said driving fluid is water under pressure.

5. Apparatus according to claim 4 in which said pressure resistant tank is slightly larger in capacity than the volume of purified water to be stored therein.

6. Apparatus according to claim 4 in which a pipe connects the purified water output of said water purification unit to the inlet of a first check valve, a pipe connects the outlet of said first check valve to said pressure-resistant tank on one side of said diaphragm and also to piping for delivery of purified water to point of use, a pipe connects the water line supplying water under superatmospheric pressure to said water purification unit to the input of a pressure reducing valve, a pipe connects the output of said pressure reducing valve to said pressure-resistant tank on the other side of said diaphragm and also to the input of a pressure relief valve and also to the outlet of a second check valve, and a pipe connects the inlet of said second check valve to purified water delivery piping, said pressure reducing valve being adapted to control the pressure of the water driving fluid in said pressure-resistant tank at a pressure lower than the pressure at which impure water is introduced into said water purification unit and sufficiently above atmospheric pressure to promote delivery of purified water to point of use, and said pressure relief valve adapted to relieve pressure at a pressure higher than that at which said pressure reducing valve is set but lower than that at which impure water is introduced into said water purification unit.

7. Apparatus according to claim 1 in which said driving fluid is compressed air.

8. Apparatus according to claim 7 in which said pressure resistant tank is 20% to 300% larger in capacity than the volume of purified water to be stored therein.

9. Apparatus according to claim 7 in which a pipe connects the purified water output of said water purification unit to the inlet of a check valve, and a pipe connects the outlet of said check valve to said pressure-resistant tank and also to piping for delivery of purified water to point of use, said delivery piping including a pressure relief valve adapted to maintain pressure of water therein below the pressure at which water to be purified is introduced into said water purification unit but sufficiently above atmospheric pressure to promote delivery of said purified water to point of use.

10. A method for storing purified water produced in a water purification unit into which water to be purified is introduced under superatmospheric pressure, which comprises:
 (a) introducing said purified water into a closed pressure resistant container;
 (b) while maintaining a driving fluid under pressure also in said pressure resistant tank; and
 (c) said driving fluid being maintained at a pressure sufficiently below the pressure at which water to be purified is introduced into said water purification unit to provide pressure drop for operation of the water purification unit, and at a pressure sufficiently above atmospheric to maintain said purified water in said pressure-resistant tank at a pressure sufficient to promote delivery to point of use, said driving fluid and said purified water in said pressure-resistant tank being maintained separate by interposition therebetween of a flexible diaphragm.

References Cited
UNITED STATES PATENTS

| | | | |
|---|---|---|---|
| 565,973 | 8/1896 | Fowler | 210—258 |
| 1,825,631 | 9/1931 | Horvath | 210—137 X |
| 3,355,382 | 11/1967 | Huntington | 210—22 |

REUBEN FRIEDMAN, Primary Examiner

F. A. SPEAR, JR., Assistant Examiner

U.S. Cl. X.R.

210—116, 130, 134, 136, 137, 198, 254, 257, 258, 321, 349, 416, 433